United States Patent
Costanzo

(10) Patent No.: US 6,494,312 B2
(45) Date of Patent: Dec. 17, 2002

(54) MODULAR ROLLER-TOP CONVEYOR BELT WITH OBLIQUELY-ARRANGED ROLLERS

(75) Inventor: Mark B. Costanzo, River Ridge, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/836,665

(22) Filed: Apr. 16, 2001

(65) Prior Publication Data

US 2001/0045346 A1 Nov. 29, 2001

Related U.S. Application Data

(63) Continuation-in-part of application No. 09/824,320, filed on Apr. 2, 2001, which is a continuation of application No. 09/629,776, filed on Jul. 31, 2000, now Pat. No. 6,209,714, which is a continuation of application No. 09/184,926, filed on Nov. 2, 1998, now Pat. No. 6,148,990.

(51) Int. Cl.⁷ .............................................. B65G 17/24
(52) U.S. Cl. ....................................................... 198/779
(58) Field of Search .................................. 198/779, 853

(56) References Cited

U.S. PATENT DOCUMENTS

| | | |
|---|---|---|
| 3,550,756 A | 12/1970 | Kornylak |
| 4,231,469 A | 11/1980 | Arscott |
| D299,424 S | 1/1989 | Schroeder et al. |
| D299,425 S | 1/1989 | Schroeder et al. |
| 4,821,869 A | 4/1989 | Hodlewsky |
| 4,880,107 A | 11/1989 | Deal |
| 4,909,380 A | 3/1990 | Hodlewsky |
| 4,993,540 A | 2/1991 | Van Capelleveen |
| 5,096,050 A | 3/1992 | Hodlewsky |
| 5,224,583 A | 7/1993 | Palmaer et al. |
| 5,238,099 A | 8/1993 | Schroeder et al. |
| 5,261,525 A | 11/1993 | Garbagnati |
| 5,330,045 A | 7/1994 | Hodlewsky |
| 5,400,896 A | 3/1995 | Loomer |
| 5,404,997 A | 4/1995 | Schrier et al. |
| 5,551,543 A | 9/1996 | Mattingly et al. |
| 5,706,934 A | 1/1998 | Palmaer et al. |
| 6,148,990 A | 11/2000 | Lapeyre et al. |
| 6,209,714 B1 | 4/2001 | Lapeyre et al. |

OTHER PUBLICATIONS

Polyketting, "Multiwheel Conveyor" catalog, date unknown, Zelhem, Netherlands.

Intralox Brochure, "Intralox Product Line," especially Series 400 and Series 800, copyright 1996.

Primary Examiner—Joseph E. Valenza
(74) Attorney, Agent, or Firm—James T. Cronvich

(57) ABSTRACT

A modular roller-top conveyor belt constructed of a series of rows of belt modules having hinge elements at opposite ends of each row. The hinge elements of each row are interleaved with the hinge elements of an adjacent row and interlinked by hinge pins to form an endless conveyor belt. Each of the belt modules includes a body section extending between opposite ends of each row in the direction of belt travel. Cavities formed in at least some of the modules open onto an upper conveying surface of the belt. Rollers residing in the cavities protrude onto the upper conveying surface to engage conveyed articles in rolling, low-friction contact. The rollers may be cylindrical rollers that rotate about axles, spherical balls that rotate in all directions, or caster-like roller assemblies. The rollers may be arranged to rotate about axes in the direction of belt travel for side-off transfer of articles, about axes oblique to the direction of belt travel for side justification, or about axes transverse to the direction of belt travel for low backline pressure.

10 Claims, 10 Drawing Sheets

MODULAR ROLLER-TOP CONVEYOR BELT WITH OBLIQUELY-ARRANGED ROLLERS

This application is a continuation in part of application Ser. No. 09/824,320 filed Apr. 2, 2001 which is a continuation of 09/629,776 filed Jul. 31, 2000 now U.S. Pat. No. 6,209,714 which is a continuation of application Ser. No. 09/184,926 filed Nov. 2, 1998.

BACKGROUND

The invention relates to power-driven conveyors and, more particularly, to modular conveyor belts constructed of rows of belt modules hingedly interlinked end-to-end by hinge pins.

Conventional modular conveyor belts and chains are made up of modular links, or belt modules, arranged in rows. Spaced apart link ends extending from each end of the modules include aligned apertures. The link ends along one end of a row of modules are interleaved with the link ends of an adjacent row. A pivot rod, or hinge pin, journalled in the aligned apertures of the end-to-end-connected rows, connects adjacent rows together to form an endless conveyor belt capable of articulating about a drive sprocket.

In many industrial applications, articles are allowed to accumulate on a continuously moving conveyor belt before being off-loaded. Friction between the conveying surface of the moving belt and the accumulated articles causes the articles to push against each other increasing backline pressure. Backline pressure can cause damage to the articles, excessively load the conveyor belt and its drive components, and accelerate belt wear. Rotatable elements, such as rollers, in rolling contact with the undersides of conveyed articles have been used to reduce friction and lower backline pressure.

In other conveyor applications, articles must be pushed off the side of a constantly moving or stop-and-go conveyor belt. Rollers oriented with their axes of rotation in the direction of belt travel have been used to provide low friction rolling contact with the undersides of conveyed articles being pushed off the side of a conveyor.

Arscott U.S. Pat. No. 4,231,469, issued Nov. 4, 1980, discloses a conveyor comprising a plurality of interconnected cradles and a rotatable member mounted in each cradle. The rotatable members extend above the respective cradle for rolling contact with an object placed on the conveyor to allow the objects to move relative to the conveyor. The Arscott patent discloses rotatable members with axes of rotation in the direction of belt travel for side off-loading and perpendicular to the direction of belt travel for low backline pressure.

One shortcoming of the Arscott conveyor and other roller-top belts is that they are difficult to clean owing to the many surfaces and nooks and crannies associated with the rollers. Cleanability is especially important in some industries, such as meat-handling, where bacteria can form in and spread from difficult-to-clean areas.

Another shortcoming of many low backline pressure conveyors is the placement of a roller on the pivot rod. Such a placement requires fewer or thinner link ends resulting in less belt pull strength or narrow rollers resulting in high contact pressure on conveyed articles. Thus, there is a need for a modular conveyor belt that features low backline pressure or low-friction side transfer and that is easy to clean.

In yet other applications, it is desirable to justify conveyed articles along one side of the conveyor belt where they can be appropriately processed. Examples include applying labels, reading bar codes, and singulating. Pusher bars, slat conveyors with side-to-side moving shoes, and other even more complex mechanisms are used for these purposes. What is needed is a modular conveyor belt that can be used to justify articles in a simple manner.

SUMMARY

These needs and others are satisfied by the invention, which provides a modular roller-top conveyor belt. The belt is constructed of a series of rows of belt modules having hinge elements at opposite ends of each row. The hinge elements of one row are interleaved with the hinge elements of an adjacent row. Hinge pins interlink the interleaved hinge elements of adjacent rows to form an endless conveyor belt with pivotable joints between each row. Each row is constructed of one or more belt modules. Each module includes a body section extending between first and second ends in the direction of belt travel. The body section includes a bottom surface and an opposite upper deck that forms an upper surface. At least one cavity is formed in the body section of one or more of the modules. The cavity opens onto the upper surface. A roller residing in the cavity engages conveyed articles in rolling, low-friction contact.

In various versions of the belt of the invention, the rollers are cylinders for rotation about axes parallel to, perpendicular to, or oblique to the direction of belt travel or balls for omnidirectional rotation.

In one version of the belt of the invention, the cavity extends from the upper surface completely through the body section to an opening in the bottom surface to allow debris to fall through. In another version, the belt has a transverse drive element extending from the bottom surface and the cavity does not extend through the drive element to allow for placement of drive sprockets across the entire width of the belt row.

In versions with a cylindrical roller, the belt includes an axle that fits through a central bore in the roller. Opposite walls of the cavity have collinear holes to support the ends of the axle. In a version having more than one cavity in the body section, the collinear holes can be extended to join the cavities and form a passageway along a transverse axis to admit a single axle on which all the rollers ride. The roller can be made of a rubber material with its bore lined by a bushing to receive the axle. In a version designed for side transfer of articles, at least one of the collinear holes opens into a gap between consecutive hinge elements for easy insertion of the axle during module construction. As the belt is put together, the axle is retained in the holes by an interleaved hinge element of an adjacent belt row disposed in the gap. To guide articles that drop onto the conveyor on an edge or otherwise skewed orientation, another version of the belt of the invention features an upwardly sloping, for example, convex, upper surface. The upper surface rises from the first and second ends of the belt rows toward the roller. This construction tends to guide the skewed article into a conveying position atop the roller. A version with a pivotable support mounted in the cavity and a roller and axle rotatably supported in the support provides a caster-like action that gives the rollers the versatility to roll in all directions.

In a version of the belt of the invention used for justifying articles along one side of the belt, the cavities are formed to admit cylindrical rollers arranged to rotate on an oblique axis. The cavities extend completely through the module body section. The diameter of the rollers is preferably greater than the thickness of the body section. In this way, the roller protrudes above the upper conveying surface of the module to engage conveyed articles in rolling contact and below the bottom driving surface to engage a roller bearing surface in the belt conveyor support frame that causes the rollers to rotate, thereby guiding the conveyed articles toward one side of the belt justified along a side edge.

In one version of the belt of the invention for use with roller balls, the cavity includes a recessed surface that supports bearing elements, which provide low-friction bearing surfaces for the ball. The bearings elements are ridges rising from the recessed surface of the cavity. In another version, the bearing elements include a plurality of ball bearings in a ball bearing holder. A cover has a circular aperture with a diameter less than the diameter of the ball to retain it in the cavity with just a portion of the ball protruding above the surface of the cover into rolling contact with conveyed articles. The cover can be integrally molded with the upper deck to engage retention structure on the upper deck in snap-fit retention. In one integrally molded version, the cover includes a lip defining the circular aperture whose diameter is adjustable by deformation, for example, from a first diameter to a second diameter. The first diameter is greater than the diameter of the ball to allow the ball to be installed in the cavity. The second diameter is less than the diameter of the ball to retain the ball in the cavity with a portion of the ball protruding through the cover into rolling contact with conveyed articles. In another version, the cover has sloping sides to guide askew articles into position atop the roller balls.

DRAWINGS

These and other advantages, features, and aspects of the invention are described in more detail in the following description, appended claims, and accompanying drawings in which:

DESCRIPTION

Figure 1:
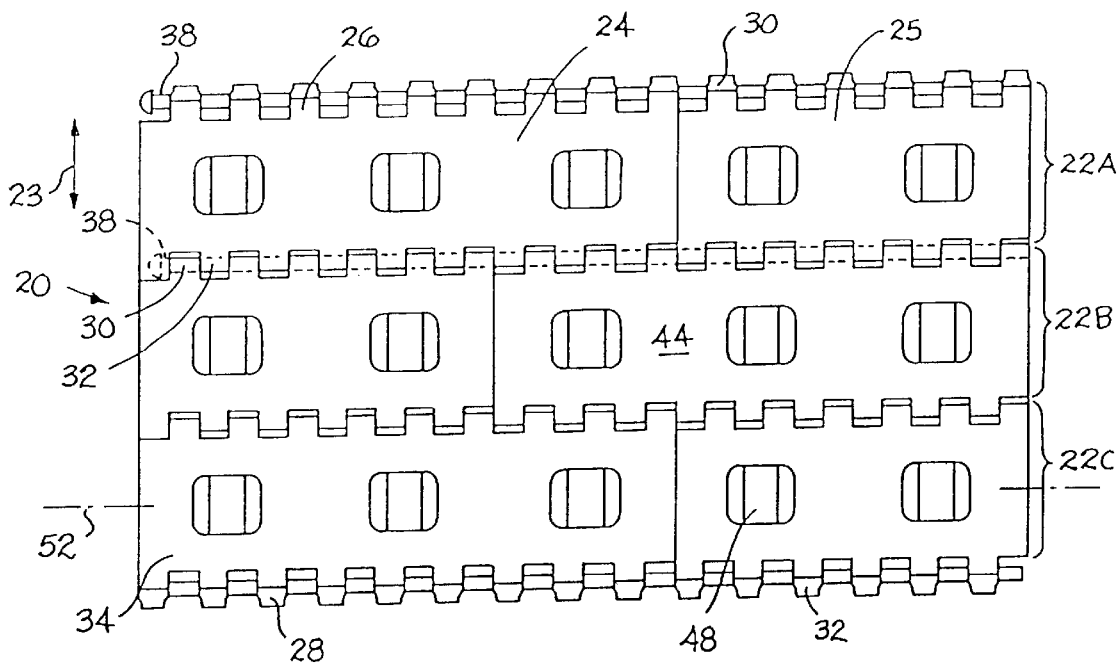
FIG. 1 is top plan view of a portion of one version of a conveyor belt having features of the invention.

A portion of an exemplary version of a modular roller-top conveyor belt having features of the invention is shown in FIG. 1. The belt depicted has many of the features of and is similar to the Intralox Series 800 modular plastic conveyor belt manufactured by Intralox, Inc. of Harahan, La., a subsidiary of the assignee of this invention. The belt 20 is constructed of a series of rows 22A–22C of belt modules 24, 25, each shown with one or more rollers 48. In this version, each row 22 includes a short edge module 25 at one edge and a long edge module 24 at the opposite edge. Other constructions are possible. For example, each row could be made up of a single module extending across the entire width of the belt. Alternatively, the belt could include one or more internal modules positioned between the edge modules 24, 25. As another alternative, modules without rollers could be interspersed with modules with rollers in a variety of roller patterns, such as no rollers on every other row or alternating rollers across the width of the belt from row to row. Although the version shown in FIG. 1 and all other constructions having multiple modules in each row are preferably arranged in a bricklaid pattern, it would be possible to construct a belt having features of the invention in an arrangement with a continuous seam along the length of the belt between adjacent side-by-side and end-to-end modules. In all of these belt constructions, wider belts can be made by building each row with more or wider modules.

Figures 2A, 2B:
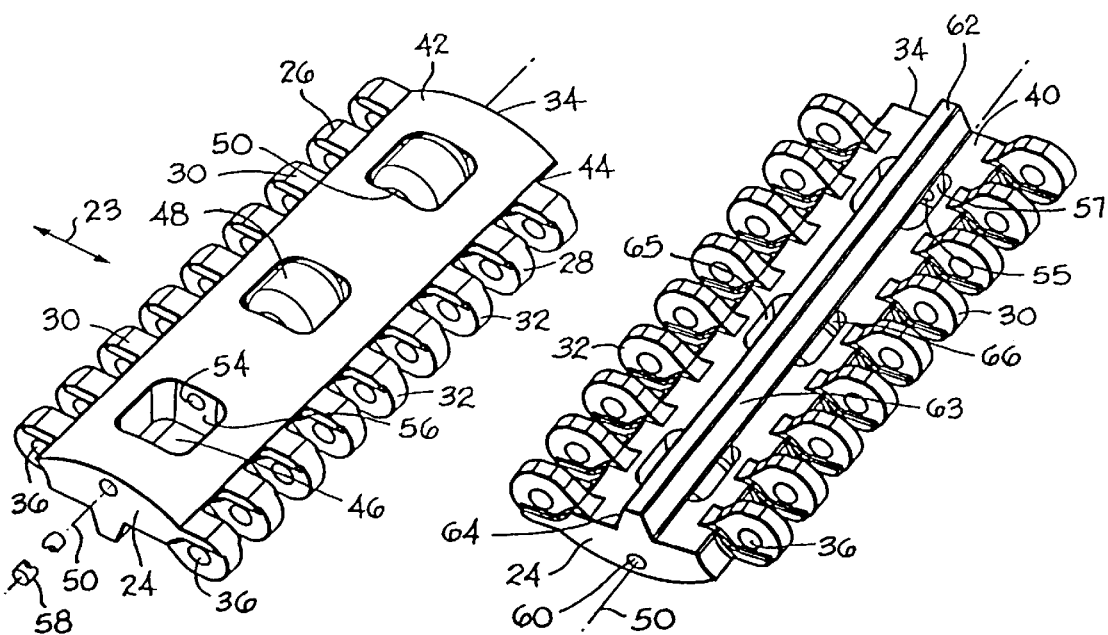
FIG. 2A is a top perspective view of a belt module usable with the conveyor belt of FIG. 1.
FIG. 2B is a bottom perspective view of the belt module of FIG. 2A.

As shown in FIG. 1 and shown in more detail in FIGS. 2A and 2B, each row 22 extends longitudinally in the direction of belt travel 23 from a first end 26 to a second end 28. A first plurality of hinge elements 30 and a second plurality of hinge elements 32 extend from an intermediate module body section 34 at the first and second ends. Axially aligned holes 36 are formed in the hinge elements at each end of the row. Consecutive rows, 22A and 22B, for instance, are interlinked hinge-like by a hinge pin 38 extending through a lateral passage formed by the aligned holes of interleaved hinge elements 30, 32 disposed at adjacent ends of consecutive rows. All the rows of the belt are connected in this way to form an endless conveyor belt capable of articulating about drive and idler sprockets (not shown). The hinge between consecutive rows can be realized equivalently in other ways. For example, stubs protruding laterally from the sides of the hinge elements at the first end of the row and extending into aligned holes in the interleaved set of hinge elements of an adjacent row could be used to hingedly interconnect adjacent rows into a belt.

The body section 34 includes a bottom surface 40 and an opposite upper deck 42 that forms a substantially continuous upper surface 44, except for cavities 46 opening onto the upper surface. A roller 48 is rotatably disposed in each cavity. A salient portion of the roller protrudes above the upper surface to engage conveyed articles in low-friction rolling contact. In the version shown in FIG. 2A–2B, the rollers are cylindrical in shape with a central bore 50 along the major axis 52 of the cylinder. The major axis in this example is perpendicular to the direction of belt travel 23. Collinear holes 54, 55 in opposite walls 56, 57 of the cavity 46 support opposite ends of an axle 58 that extends through the bore of the roller. With multiple cavities across the width of a module, the collinear holes associated with each cavity can be arranged to communicate with each other and the cavities to form a transverse passageway along an axis of rotation perpendicular to belt travel. A single axle extending through the passageway supports all the rollers on the module, although individual axles could be used. An opening 60 in at least one side edge of the modules allows the axle to be inserted into the passageway and through the rollers. If the opening is in only one side of the modules, the passageway terminates in a blind end that blocks the axle from working its way out.

A drive element 62 extends across the width of the module. The drive element has drive surfaces 63, 64 on each side for driving engagement by a drive sprocket, for example. In a preferred version, the roller cavity formed in the body section does not extend through the drive element. In this way, drive sprockets can be positioned anywhere along the width of the belt. If an uninterrupted drive element is not necessary, the cavity could extend through the drive element. The upper surface 44 of the belt slopes, or curves, upwardly from the first end 26 and the second end 28 of each row toward the middle of each row. The slope could be planar, but is preferably convex, to help guide articles, such as boxes that land on the belt corner-first, onto the rollers. The upwardly sloping upper surface also allows the roller cavity to be positioned higher to avoid interruption of the drive element. In the version shown, the upper surface 44 is substantially continuous, except for the roller positions, for cleanability. The roller and cavity can be cleaned from the bottom side through the access voids 65, 66 flanking the drive element. The voids also allow grime and debris to fall from the roller cavity. Thus, the rollers of the belt shown in FIGS. 1–2, with an axis of roller rotation perpendicular to the direction of belt travel, provide low backline pressure to conveyed articles that accumulate on the belt.

Figure 3:
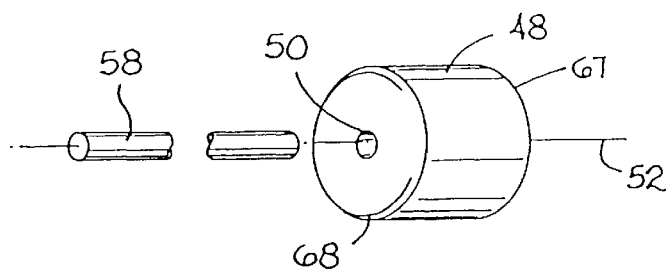
FIG. 3 is a perspective view of one version of roller and axle having features of the invention.

Details of a preferred version of the roller 48 and axle 58 used in the embodiment of the belt of FIGS. 1–2 are shown in FIG. 3. The roller is a circular cylinder having a bore 50 along its major axis 52. The edges 67, 68 of the roller are preferably rounded to provide smooth surfaces less likely to catch on edges of conveyed articles. For durability and wear resistance, the roller is preferably made of acetal, nylon, steel with bronze bearings, or polypropylene. It can be molded or machined. The roller axle 58 is preferably made of stainless spring steel, carbon spring steel, common stainless steel, or nylon. The metal axles would typically be cold drawn for a good finish. The belt module is preferably made of acetal, polyethylene, nylon, or polypropylene. The bore could be lined by a bushing pressed or molded into the bore. The bushing could be made of brass, bronze, or another durable material. With a durable bushing providing a bearing surface for the axle, the roller could be made of a less expensive material or less durable material, such as rubber.

Figure 5:
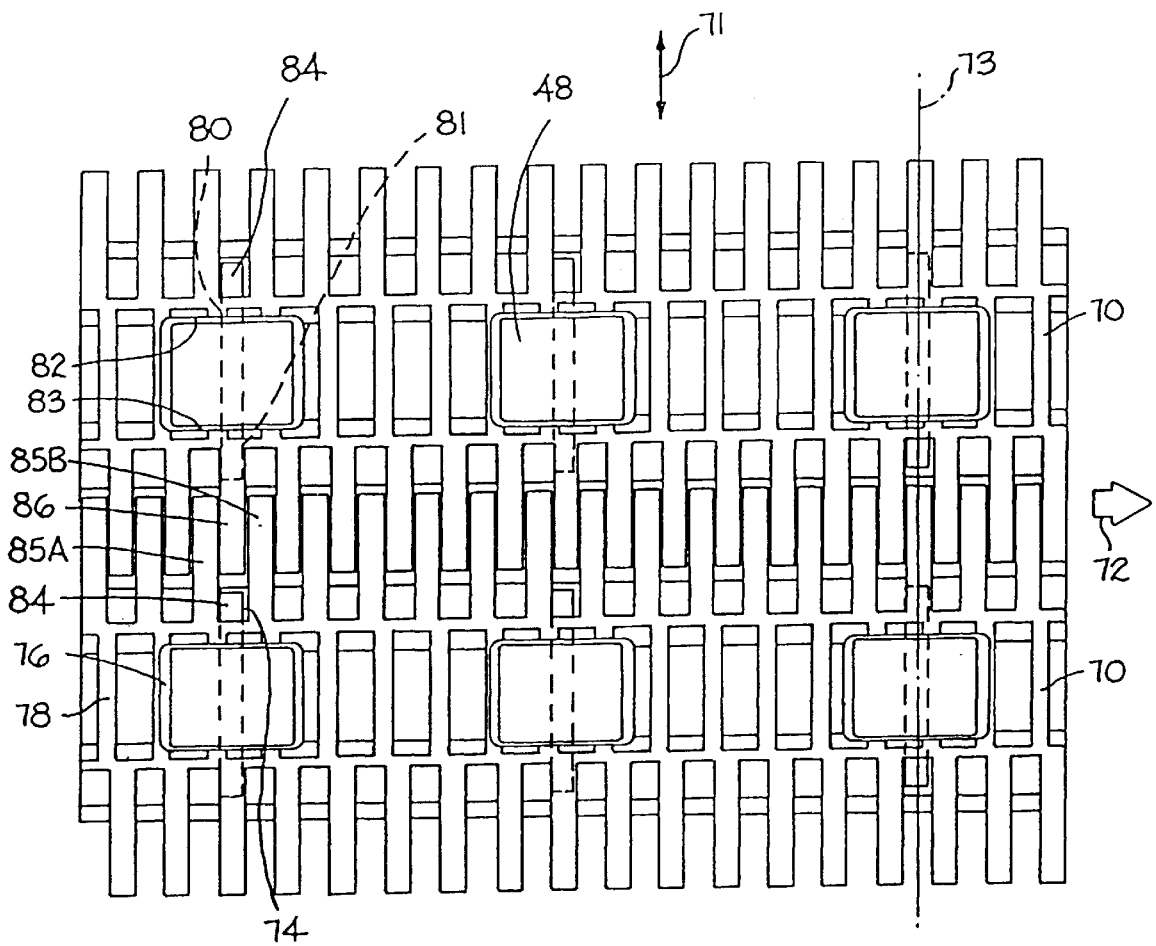
FIG. 5 is a bottom plan view of a portion of a conveyor belt constructed of modules as in FIG. 4.
Figure 4:
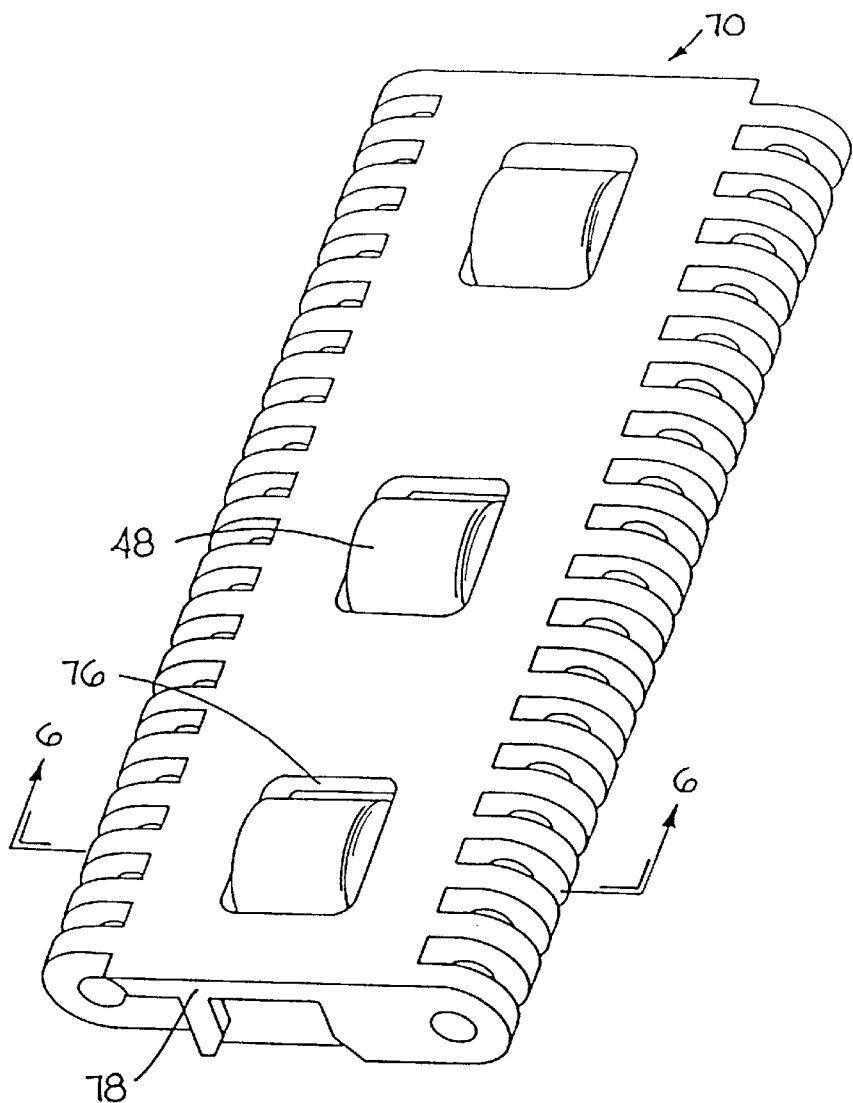
FIG. 4 is a top perspective view of another belt module for use with a conveyor belt having features of the invention.
Figure 6:
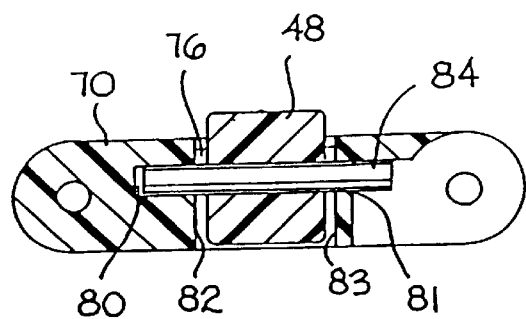
FIG. 6 is a sectional elevation view of the belt module of FIG. 4 viewed along cut line 6 of FIG. 4.

The rollers of FIG. 3 could likewise be used in another version of the roller-top belt of the invention as shown in FIGS. 4–6. In this version, the belt module 70 depicted is similar to and has many of the features of the Intralox Series 400 modular plastic conveyor belt modules. The purpose of the belt constructed of the modules is to allow conveyed articles to be transferred off the side of the belt in the direction of the arrow 72. In this version of the belt, the axis of rotation 73 of the rollers 48 is in the direction of belt travel 71. A cavity 76 formed in the body section 78 extends through the thickness of the module to allow debris to drop through easily. Collinear holes 80, 81 in opposite walls 82, 83 of the cavity support the ends of an axle 84 journalled in the bore 50 through the roller. The cavity and the holes can be molded or machined into the belt module. At least one of the holes opens into a gap 74 between consecutive hinge elements 85A, 85B of a module. Once in place, the axle is prevented from working its way out of the hole by the interleaved hinge element 86 of an adjacent row extending into the gap. With the axis of rotation parallel to belt travel, articles can be easily transferred off the side of a belt constructed of the modules of FIGS. 4–6 by a lateral push. Although shown with a closed, flat top surface, the belt could alternatively include open areas for drainage or reduced mass.

Another variation of the roller-top belt of FIGS. 4–6 is illustrated in FIGS. 18–22. In this version, the belt module 170 has shown three cavities 176 formed in the body section 178. The cavities preferably extend completely through the thickness 179 of the module. Cylindrical rollers 188 having a diameter 175 greater than the thickness of the module are rotatably supported in the cavities, which are preferably, although not necessarily, aligned across the width of the module. The cavities are also oriented oblique to the direction of belt travel 171 along an angle α with respect to the transverse axis 176 of the module. Each roller is supported by an axle 184 preferably molded into the module along an axis of rotation 174 of the roller. Like the other versions of modules already described, the module of FIGS. 18–22 is designed to be interlinked end to end and side to side with other modules to form a modular conveyor belt of any length or width. A belt constructed of the modules 170, 171' of FIGS. 18–22 is particularly useful in moving articles 180 to one side of the belt or the other.

The justification of articles is achieved by the obliquely arranged rollers shown in FIGS. 18–22. Because the diameter 175 of the rollers is greater than the thickness 179 of the modules, salient portions of the rollers protrude above the top conveying surface 182 and below the bottom driving surface 183 of the belt. Roller bearing surfaces 185 supported in the conveyor frame (not shown) are arranged to underlie the rollers in rolling frictional contact along at least a portion of the conveying path along which justification is to occur. The bearing surfaces are preferably made of a material, such as a rubber-like material for frictional contact, to cause the rollers to rotate as the belt is driven in the direction of travel 171. Articles supported on the obliquely arranged rollers are thereby urged in the direction of the arrow 186 toward the left side of the belt in FIG. 21. An angle α of about 60° is an example of just one arrangement.

Side rails (not shown) in the conveyor frame reatain the justified articles along a side of the belt. The roller bearing surfaces are needed only in those portions of the conveyor system where justification is desired. It should be appreciated that the bearing surfaces 185 could alternatively be automated and powered to move into and out of contact with he rollers as required, as indicated by up-down arrows 190 in FIG. 20. It should further be appreciated that a belt could be constructed as in FIG. 22 with rollers along one side oriented to direct conveyed articles tot hat side edge and with rollers along the other side oriented toward the other side to direct conveyed articles toward its other side edge. Furthermore, obliquely arranged rollers not extending through the bottom drive surface of the belt into contact with a roller bearing surface can also be used to allow conveyed articles to be pushed in a selected direction.

Figure 7:
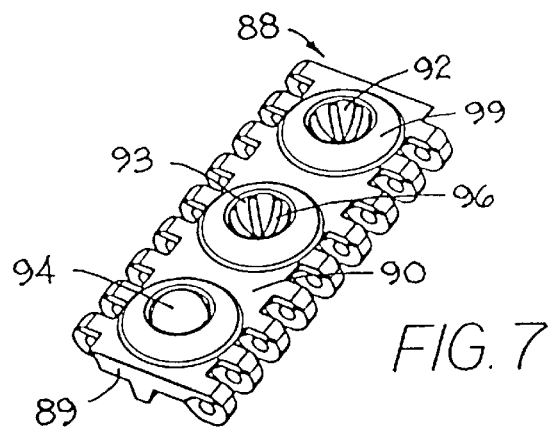
FIG. 7 is a top perspective view of yet another belt module for use with a conveyor belt having features of the invention, including a roller ball.
Figure 8:
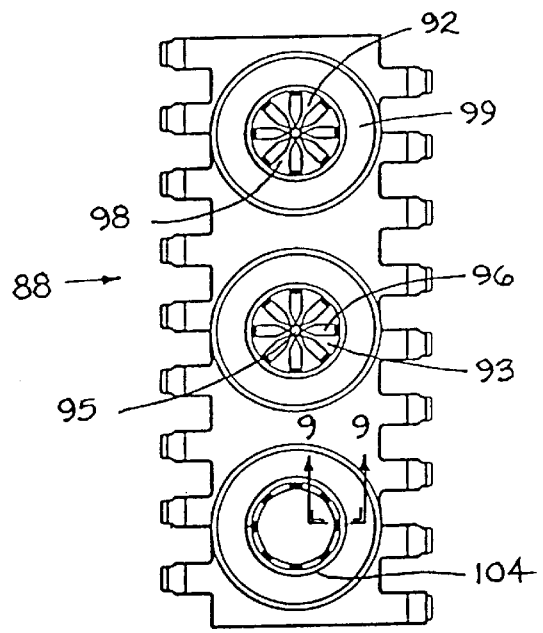
FIG. 8 is a top plan view of the belt module of FIG. 7.
Figure 12:
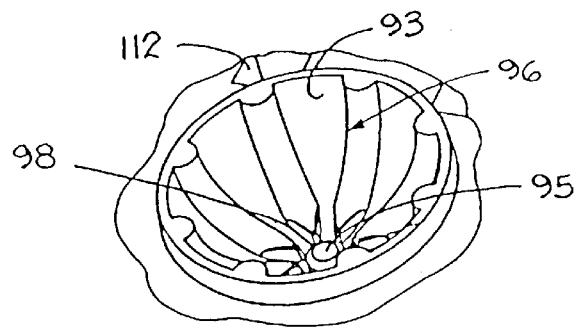
FIG. 12 is a blow-up of one of the roller ball cavities of FIG. 11.

Other versions of rollers and belt modules having further features of the invention are illustrated in FIGS. 7–15. The integral module 88 of FIGS. 7–8 is shown by way of example as having many of the characteristics of the Intralox Series 800 module including a body section 89 and an upper deck 90. A recessed surface 93 formed in the body section and opening onto the upper deck bounds a partial spherical cavity 92 sized to contain a roller ball 94. Raised ribs 96 extend upwardly from the recessed spherical surface in the manner of lines of longitude from a polar center support 95 to provide sliding bearing support for the ball 96. As seen in FIG. 12, small openings 98 between the ribs in the bottom of the recessed surface allow the cavity to be cleaned by a water spray and to drain. A cover 99 extending from the upper deck 90 serves to extend the cavity upwardly and to provide a sloping surface to direct askew articles into orderly contact with the ball. The ribs and center support allow the ball to rotate freely in all directions.

Figure 9A:
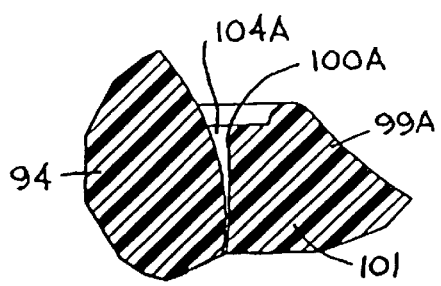
FIG. 9A is a fragmentary cross section view of the belt module of FIG. 8 along cut line 9—9, showing a roller ball and cover in an undeformed state for insertion of the ball.
Figure 9B:
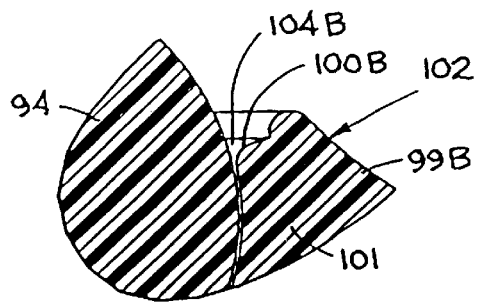
FIG. 9B is a fragmentary cross section as in FIG. 9A showing the cover deformed to retain the ball.

The ball is retained in the cavity by features shown in FIGS. 9A and 9B. In FIG. 9A, the cover 99A is shown in its original shape with a lip 100A at the upper end of the recessed surface bordering a circular aperture 104A having a first diameter greater than the diameter of the ball 94 for easy insertion of the ball into the cavity. After the ball is inserted in the cavity, an upper adjustable portion 101 of the cover 99B is deformed by pressure applied with a component of force roughly in the direction of arrow 102 (FIG. 9B) to bend the lip 100B to decrease the diameter of the circular aperture 104B to a second diameter less than the diameter of the ball to retain it free to rotate in the cavity with a salient portion protruding through the aperture into rolling contact with conveyed articles. Deformation pressure can be applied, for example, by a hollow cylindrical tool that is pressed down vertically on the cover to adjust its shape from that in FIG. 9A to that in FIG. 9B. The entire belt module, including cover, is preferably integrally molded of a plastic material, but could be machined or cast of metal. The cover could be a separate piece held in place by gluing or spin-welding. The ball could be molded or formed in other ways of the same or other materials, including metals.

Figure 11:
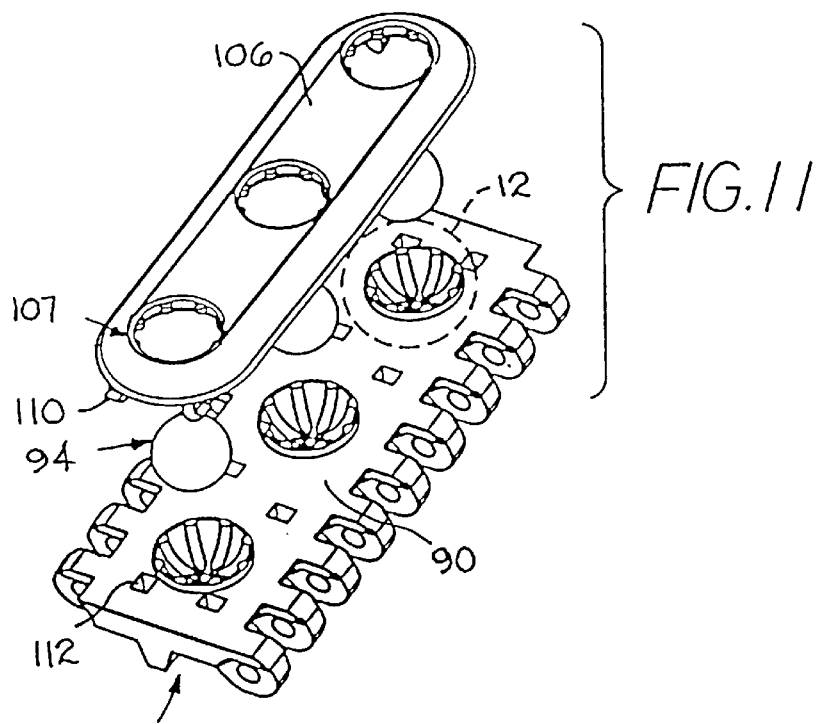
FIG. 11 is an exploded perspective view of the belt module, cover, and roller balls of FIG. 10.
Figure 10:
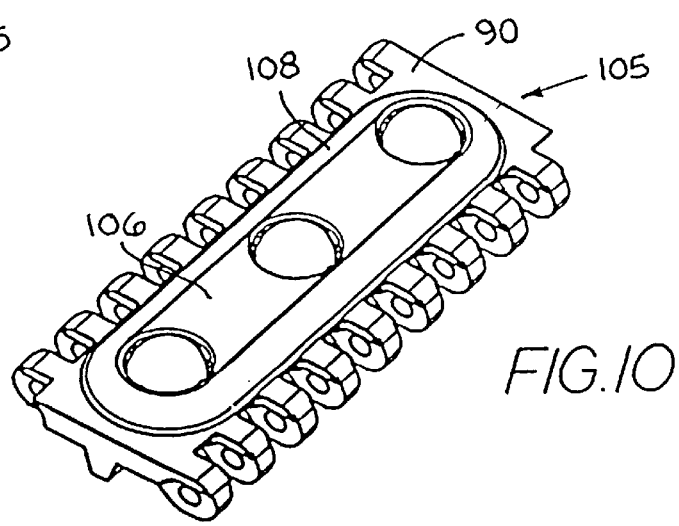
FIG. 10 is a top perspective view of another belt module having features of the invention, including a roller ball retaining cover.

Another version of roller ball retention is shown in FIGS. 11–12. In this version, the cover 106 shown is oblong with three circular apertures 107 formed therein. The diameter of each aperture is less than the diameter of the roller balls 94. The cover has sloping sides 108 to guide askew articles into orderly contact with the roller balls. The cover also has retention elements in the form of tabs 110 that mate with retention structure in the form of rectangular slots 112 formed in the upper deck 90 of the module 105. The tabs snap into the slots and retain the entrapped balls free to rotate in the cavities. The covers can be removed to replace worn balls.

Figure 15:
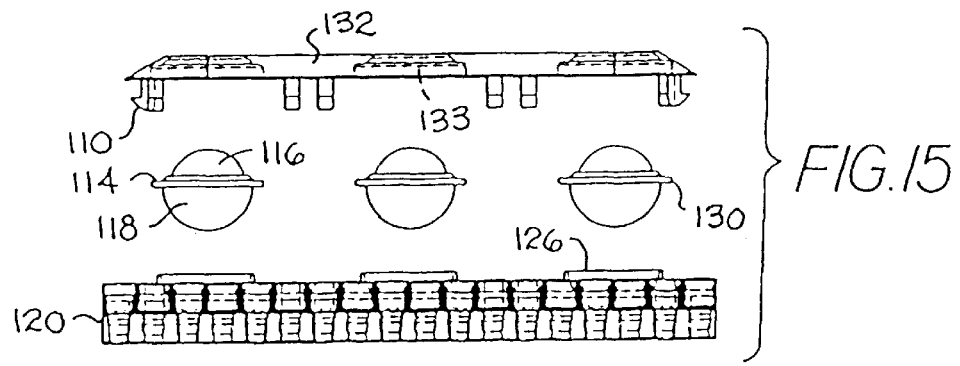
FIG. 15 is an exploded elevation view of the belt module of FIG. 13.
Figure 14:
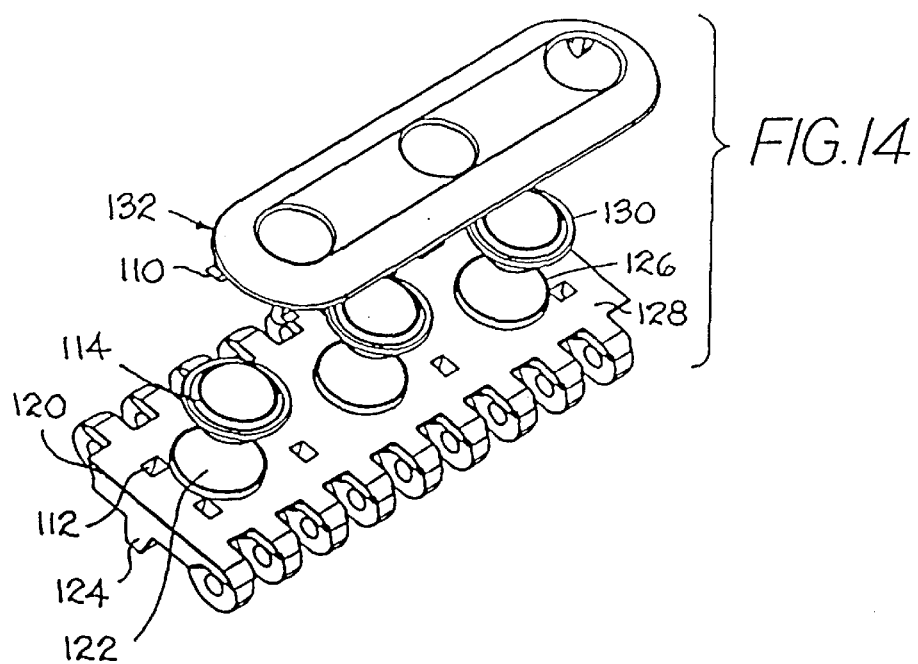
FIG. 14 is an exploded perspective view of the belt module of FIG. 13, showing the cover, belt module, and transfer ball assemblies.
Figure 13:
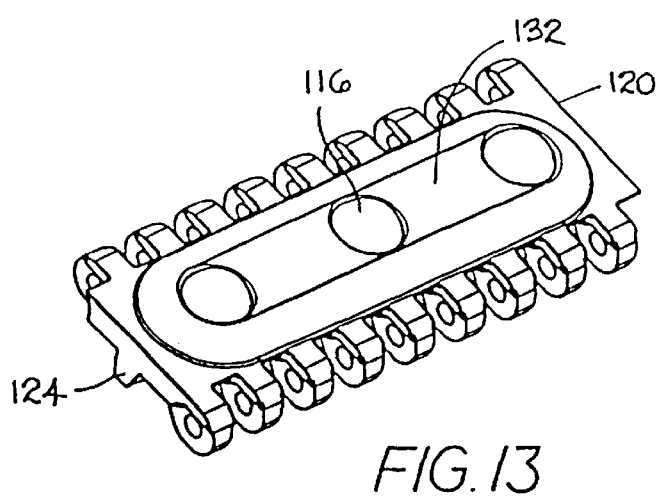
FIG. 13 is a top perspective view of another belt module having features of the invention, including a cover for transfer ball assemblies.

Yet another version of a belt module having a roller top is illustrated in FIGS. 13–15. In this version, conventional metal transfer ball assemblies 114, such as those available through the McMaster-Carr catalog, are used. The assemblies include a metal ball 116 supported in a holder 118 on a plurality of ball bearings (not shown). A belt module 120, similar to that in FIG. 11, provides cavities 122 for the transfer ball assemblies. The cavities are generally open, at least down to the drive bar 124, to admit the self-contained assemblies. A shoulder 126 formed on the upper deck 128 of the module supports the transfer ball assembly, which has a circumferential flange 130 that rests on the shoulder. A cover 132 has retention tabs 110 that mate with retention structure in the form of rectangular slots 112 formed in the upper deck. The cover for the transfer ball assemblies includes indentations 133 conforming to the shape of the upper portion of the transfer ball assemblies for a snug fit. In other respects, the cover is similar to that of FIGS. 11–12 and retains the transfer ball assemblies in the belt movable with only a salient portion of the ball protruding in freely rolling contact with conveyed articles.

Figure 16:
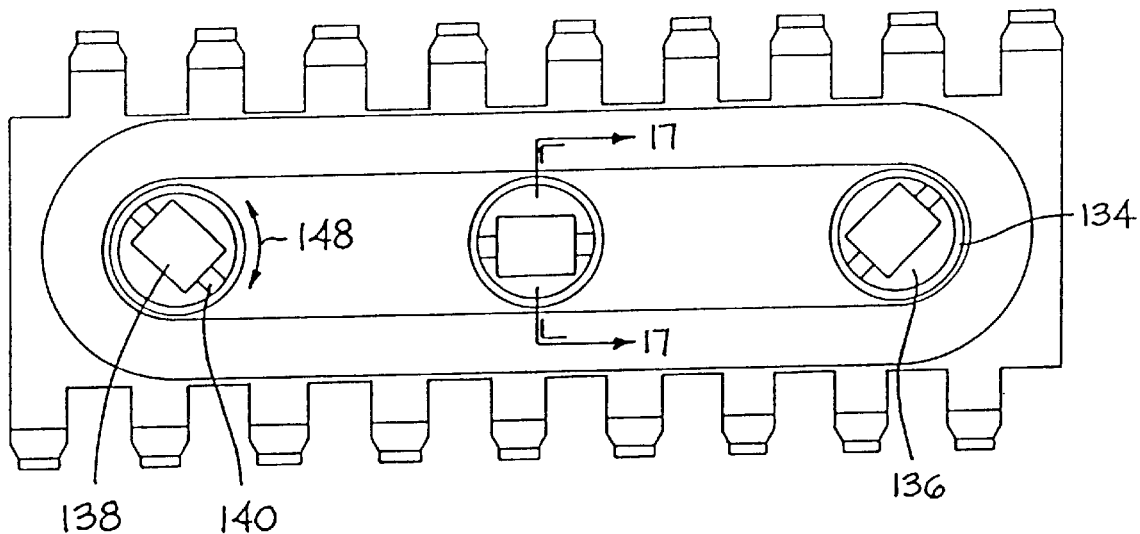
FIG. 16 is a top plan view of another belt module having features of the invention, including caster roller assemblies.
Figure 17:
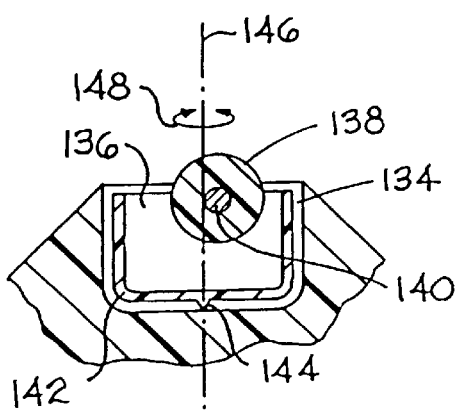
FIG. 17 is a partial cross section view of the belt module of FIG. 16 along cut line 17—17.
Figure 18:
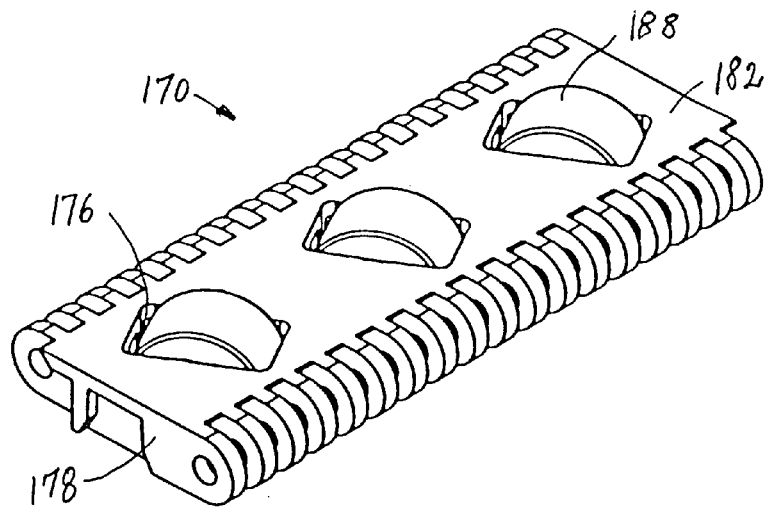
FIG. 18 is a top isometric view of yet another belt module having features of the invention, including obliquely arranged rollers.
Figure 19:
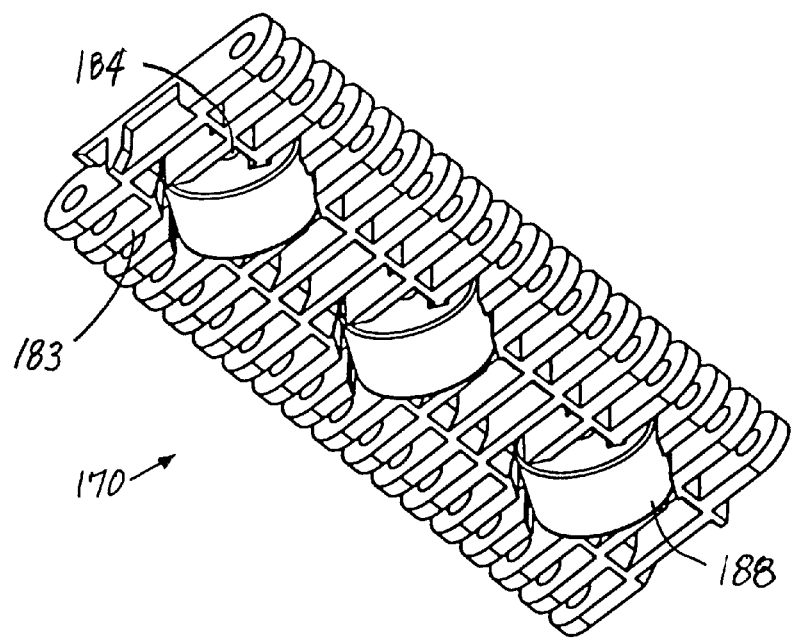
FIG. 19 is a bottom isometric view of the belt module of FIG. 18.

Another way of achieving multidirectional rolling contact with conveyed articles is shown in FIGS. 16 and 17. Instead of a transfer ball, the belt module includes a caster assembly 136 disposed in a generally cylindrical cavity 134. The caster assembly comprises a roller 138 and axle 140 mounted in a rotatable support 142. The roller rotates about the axis of the axle. A pivot 144 at the bottom of the support allows the entire caster assembly to rotate about a vertical axis 146 as indicated by two-headed arrow 148. The axle is supported at its ends by the sides of the support, which include holes into which the axle extends. Although the roller axle could, it preferably does not intersect the vertical pivot axis to provide more freely swinging caster action to the roller in contact with conveyed articles. Preferably, the pivot axis and the axis of the axle lie in mutually perpendicular planes.

Thus, the invention has been described with respect to various versions of rollers, both cylindrical rollers with axles and spherical balls on bearing elements. Even so, those skilled in the art will easily appreciate that other modifications of the exemplary versions are possible without materially departing from the novel teachings and advantages of the invention. For example, the axles need not be journalled in a bore through the cylindrical rollers, but could instead be fixedly attached to the rollers and rotate in the supporting holes in each wall. The axles need not extend through the rollers, but could be realized as stubs extending from each flat end of the roller into the support holes. As the examples suggest, these and other modifications are intended to be included within the scope of the invention as defined in the following claims.

What is claimed is:

1. A modular conveyor belt comprising a series of rows of belt modules and hinge pins hingedly interlinking consecutive belt rows end-to-end to form a conveyor belt, each row including at least one module comprising a body section extending from a first end to a second end in the direction of belt travel, a first plurality of hinge elements along the first end, and a second plurality of hinge elements along the second end, the first plurality of hinge elements of a row being interleaved with the second plurality of hinge elements of an adjacent row and pivotally joined by a hinge pin in a hinged connection between consecutive rows of belt modules, wherein the body section of at least some of the modules includes a conveying surface and a driving surface opposite the conveying surface, at least one cavity formed in the body section and opening onto the conveying surface, and a roller rotatably disposed in the cavity to rotate about an axis oblique to the direction of belt travel with a salient portion of each roller protruding above the conveying surface to engage conveyed articles in rolling contact and wherein a salient portion of each roller protrudes through the driving surface to engage a roller bearing surface to rotate the roller as the belt is driven.

2. A modular conveyor belt as in claim 1 wherein the diameter of the roller is greater than the thickness of the belt.

3. A modular conveyor belt as in claim 1 further comprising an axle spanning the cavity in the body section along an axis oblique to the direction of belt travel and wherein the roller includes a central bore to accommodate the axle.

4. A modular conveyor belt as in claim 1 wherein rollers on one side of the belt are oriented in a different direction from rollers on the other side.

5. A modular conveyor belt as in claim 1 wherein the roller is made of rubber.

6. A modular conveyor belt as in claim 1 wherein the roller is cylindrical.

7. A conveyor for moving conveyed articles across the conveying surface of a modular conveyor belt traveling in a direction of travel, comprising:

a modular conveyor belt supported in the conveyor and comprising a series of rows of belt modules and hinge pins hingedly interlinking consecutive belt rows end-to-end into a conveyor belt having a top conveying surface and an opposite bottom surface and forming cavities opening onto the top conveying surface and the bottom surface, the conveyor belt further including cylindrical rollers disposed in the cavities and arranged to rotate about axes oblique to the direction of belt travel, wherein salient portions of the rollers protrude above the top conveying surface and below the bottom surface; and a roller bearing surface supported in the conveyor beneath the bottom surface of the belt and arranged to underlie at least some of the rollers in rolling contact with the salient portions protruding below the bottom surface to rotate the rollers as the belt travels, thereby moving articles supported on the salient portions of the rollers protruding above the top conveying surface obliquely across the belt.

8. A conveyor as in claim 7 wherein the roller bearing surface is made of a rubber-like material.

9. A conveyor as in claim 7 wherein rollers on one side of the belt are oriented in a different direction from rollers on the other side.

10. A conveyor as in claim 7 wherein the roller bearing surfaces are powered to move into and out of contact with the rollers.

* * * * *

UNITED STATES PATENT AND TRADEMARK OFFICE
CERTIFICATE OF CORRECTION

Figure 20:
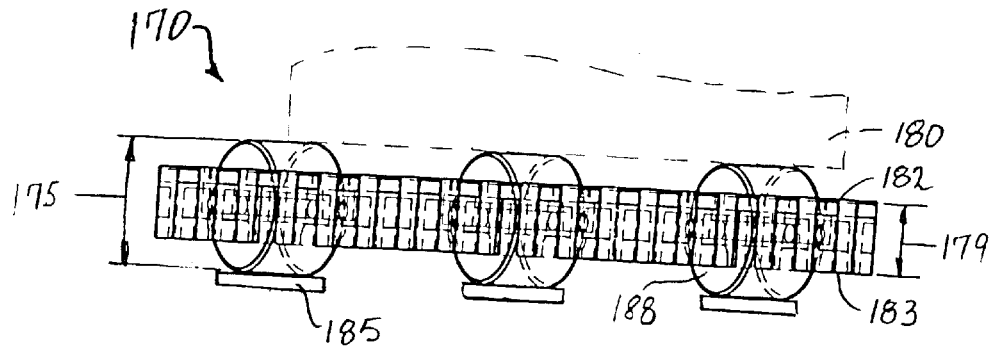
FIG. 20 is a front elevation view of the module of FIG. 18 shown with roller bearing surfaces beneath the rollers.
Figure 21:
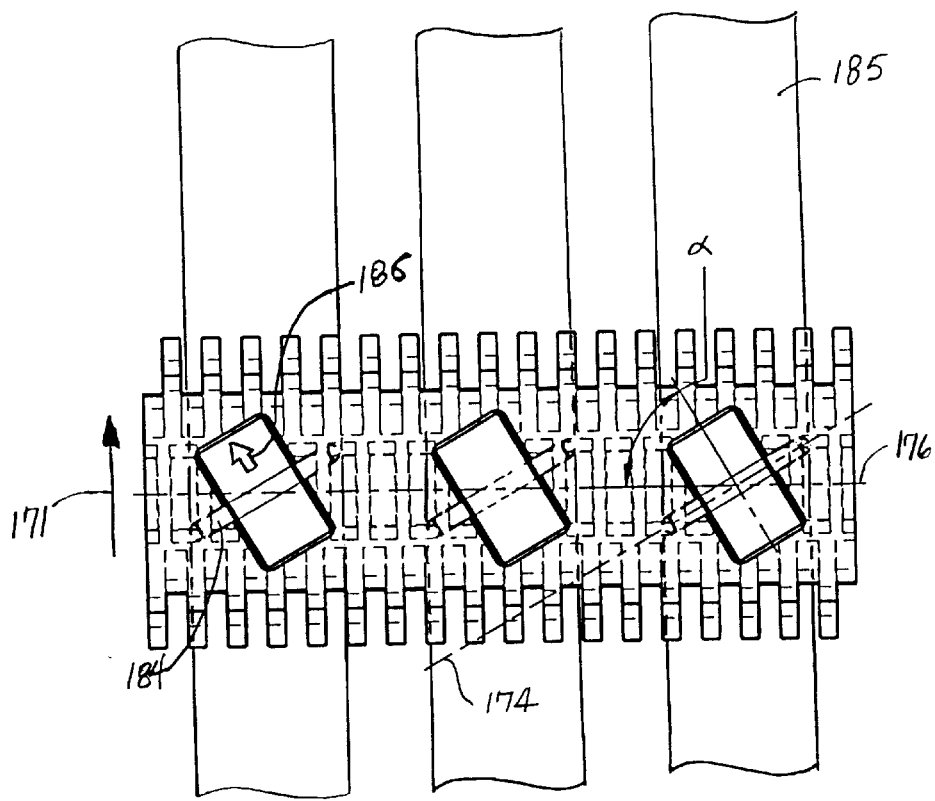
FIG. 21 is a top plan view of a portion of a conveyor system using the modules of FIG. 18.
Figure 22:
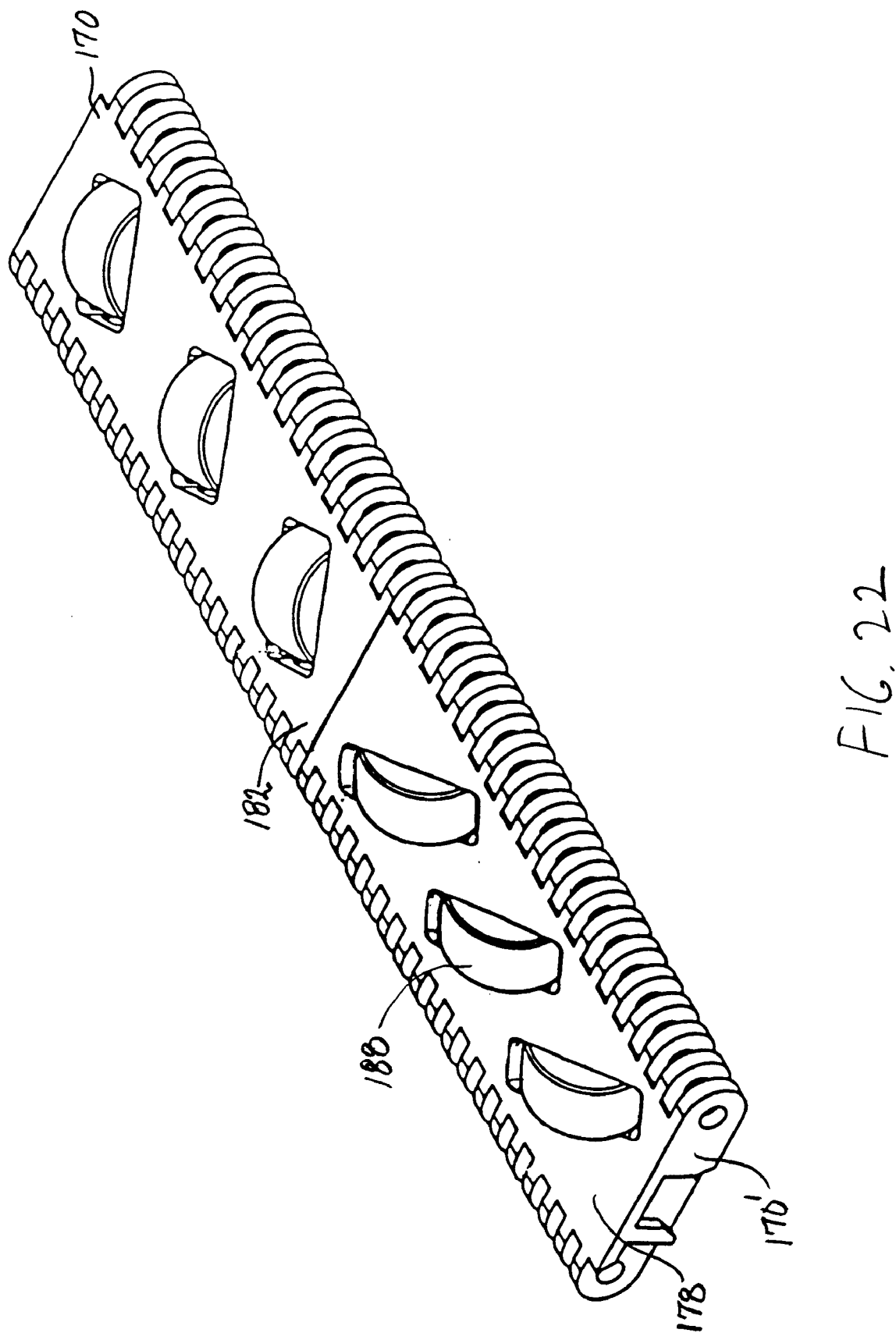
FIG. 22 is an isometric view of one row of a conveyor belt made up of two belt modules as in FIG. 18.

PATENT NO.      : 6,494,312 B2                                           Page 1 of 1
DATED           : December 17, 2002
INVENTOR(S)     : Mark B. Costanzo It is certified that error appears in the above-identified patent and that said Letters Patent is hereby corrected as shown below:

Drawings,
FIG. 20, should be as follows:

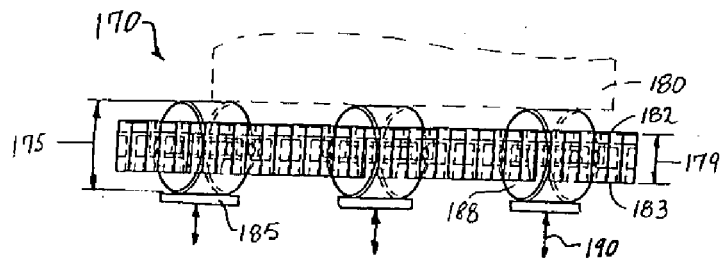

FIG. 20

Signed and Sealed this

Twenty-first Day of June, 2005

JON W. DUDAS
*Director of the United States Patent and Trademark Office*

US006494312C1

(12) EX PARTE REEXAMINATION CERTIFICATE (6010th)

United States Patent
Costanzo

(10) Number: US 6,494,312 C1
(45) Certificate Issued: Nov. 13, 2007

(54) MODULAR ROLLER-TOP CONVEYOR BELT WITH OBLIQUELY-ARRANGED ROLLERS

(75) Inventor: Mark B. Costanzo, River Ridge, LA (US)

(73) Assignee: The Laitram Corporation, Harahan, LA (US)

Reexamination Request:
No. 90/008,395, Feb. 20, 2007

Reexamination Certificate for:
Patent No.: 6,494,312
Issued: Dec. 17, 2002
Appl. No.: 09/836,665
Filed: Apr. 16, 2001

Certificate of Correction issued Jun. 21, 2005.

Related U.S. Application Data

(63) Continuation-in-part of application No. 09/824,320, filed on Apr. 2, 2001, now Pat. No. 6,367,616, which is a continuation of application No. 09/629,776, filed on Jul. 31, 2000, now Pat. No. 6,209,714, which is a continuation of application No. 09/184,926, filed on Nov. 2, 1998, now Pat. No. 6,148,990.

(51) Int. Cl.
*B65G 17/24* (2006.01)

(52) U.S. Cl. .......................................................... 198/779
(58) Field of Classification Search ................ 198/779, 198/853
See application file for complete search history.

(56) References Cited

U.S. PATENT DOCUMENTS 3,550,756 A * 12/1970 Kornylak .................... 198/637

FOREIGN PATENT DOCUMENTS

JP 08-277029 10/1996

* cited by examiner

*Primary Examiner*—Matthew C. Graham

(57) ABSTRACT

A modular roller-top conveyor belt constructed of a series of rows of belt modules having hinge elements at opposite ends of each row. The hinge elements of each row are interleaved with the hinge elements of an adjacent row and interlinked by hinge pins to form an endless conveyor belt. Each of the belt modules includes a body section extending between opposite ends of each row in the direction of belt travel. Cavities formed in at least some of the modules open onto an upper conveying surface of the belt. Rollers residing in the cavities protrude onto the upper conveying surface to engage conveyed articles in rolling, low-friction contact. The rollers may be cylindrical rollers that rotate about axles, spherical balls that rotate in all directions, or caster-like roller assemblies. The rollers may be arranged to rotate about axes in the direction of belt travel for side-off transfer of articles, about axes oblique to the direction of belt travel for side justification, or about axes transverse to the direction of belt travel for low backline pressure.

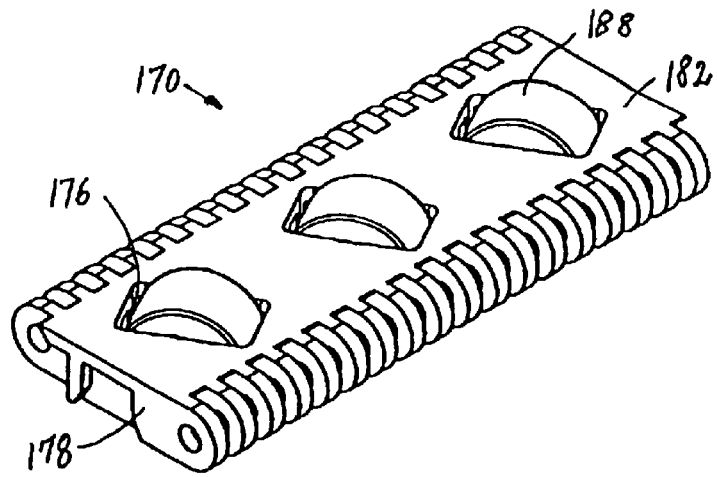

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3, 5, 6, 7, 8 and 9 is confirmed.

Claims 4 and 10 are determined to be patentable as amended.

New claims 11–46 are added and determined to be patentable.

4. A modular conveyor belt as in claim 1 *wherein a plurality of rollers are rotatably disposed in a plurality of cavities, and* wherein rollers on one side of the belt are oriented in a different direction from rollers on the other side.

10. A conveyor as in claim 7 *further comprising a plurality of roller bearing surfaces* wherein the roller bearing surfaces are powered to move into and out of contact with the rollers.

*11. A modular conveyor belt as in claim 1 having a plurality of cavities formed in the body section that are aligned across a width of the belt generally perpendicular to the direction of belt travel.*

*12. A modular conveyor belt as in claim 11 having each cavity surrounded on all sides by the conveying surface of the body section.*

*13. A modular conveyor belt as in claim 1 having a plurality of cavities formed in the body section that are aligned across a width of the belt module generally perpendicular to the direction of belt travel.*

*14. A modular conveyor belt as in claim 1 wherein the width of the conveyor belt comprises a single belt module.*

*15. A modular conveyor belt as in claim 1 wherein the width of the conveyor belt comprises at least two belt modules.*

*16. A modular conveyor belt as in claim 15 wherein at least two belt modules are of unequal length.*

*17. A modular conveyor belt as in claim 1 wherein the roller rotates about an axis angled about 60° to the direction of belt travel.*

*18. A modular conveyor belt as in claim 1 wherein each module has a plurality of cavities with respective rollers disposed in the cavities to rotate about axes oblique to the direction of belt travel.*

*19. A modular conveyor belt as in claim 1 having a plurality of rollers with respective rollers oriented toward opposite sides of the belt.*

*20. A conveyor comprising a modular conveyor belt of claims 1, 2, 3, 4, 5, 6, 11, 12, 13, 14, 15, 16, 17, 18, or 19, and having the roller bearing surface arranged to contact salient portions of the rollers below the driving surface of the belt module.*

*21. A modular conveyor belt comprising:*

*a series of rows of belt modules and hinge pins hingedly interlinking consecutive belt rows end-to-end to form a conveyor belt, each row including at least one module comprising a body section extending from a first end to a second end in the direction of belt travel;*

*a first plurality of hinge elements along the first end, and a second plurality of hinge elements along the second end, the first plurality of hinge elements of a row being interleaved with the second plurality of hinge elements of an adjacent row and pivotally joined by a hinge pin in a hinged connection between consecutive rows of belt modules;*

*wherein the body section of at least some of the modules includes a conveying surface and a driving surface opposite the conveying surface;*

*at least two cavities formed in the body section that are aligned across a width of the belt generally perpendicular to the direction of belt travel and opening onto the conveying surface and the driving surface; and*

*a plurality of rollers rotatably disposed in the cavities to rotate about axes oblique to the direction of belt travel and with a salient portion of the rollers protruding above the conveying surface to engage conveyed articles in rolling contact and wherein a salient portion of the rollers protrude through the driving surface to engage a roller bearing surface to rotate the rollers as the belt is driven.*

*22. A modular conveyor belt as in claim 21 having respective rollers oriented toward opposite sides of the belt.*

*23. A modular conveyor belt as in claim 21 wherein the width of the conveyor belt comprises a single belt module.*

*24. A conveyor as in claim 7 wherein the roller bearing surface is flat.*

*25. A conveyor as in claim 7 having the roller bearing surface adjacent to the bottom surface of the modular conveyor belt.*

*26. A conveyor as in claim 7 having a plurality of cavities formed in the top conveying surface and bottom surface of the conveyor belt that are aligned across a width of the conveyor belt generally perpendicular to the direction of belt travel.*

*27. A conveyor as in claim 7 having a plurality of cavities formed in the top conveying surface and bottom surface of the conveyor belt that are aligned across a width of the belt module generally perpendicular to the direction of belt travel.*

*28. A conveyor as in claim 7 further comprising a plurality of roller bearing surfaces.*

*29. A conveyor as in claim 28 having the number of roller bearing surfaces equal to the number of cylindrical rollers disposed in cavities across a width of the conveyor belt.*

*30. A conveyor as in claim 7 having each cavity surrounded on all sides by the top conveying surface of the conveyor belt.*

*31. A conveyor as in claim 7 having a directional component of roller rotation in a general direction of belt travel.*

*32. A conveyor as in claim 7 wherein a component of the movement of articles supported on the rollers is in a general direction of belt travel.*

*33. A conveyor as in claim 7 wherein the width of the conveyor belt comprises a single belt module.*

*34. A conveyor as in claim 7 wherein the width of the conveyor belt comprises at least two belt modules.*

*35. A conveyor as in claim 34 having at least two belt modules of unequal length.*

36. A conveyor as in claim 7 having rollers that rotate about axes angled about 60° to the direction of belt travel.

37. A conveyor as in claim 7 having respective rollers oriented toward opposite sides of the belt.

38. A conveyor for moving conveyed articles across the conveying surface of a modular conveyor belt traveling in a direction of travel, comprising:

a modular conveyor belt supported in the conveyor and comprising a series of rows of belt modules and hinge pins hingedly interlinking consecutive belt rows end-to-end into a conveyor belt having a top conveying surface and an opposite bottom surface and forming a plurality of cavities opening onto the top conveying surface and the bottom surface;

the conveyor belt further including cylindrical rollers disposed in the cavities and arranged to rotate about axes oblique to the direction of belt travel with respective rollers oriented toward opposite sides of the belt, wherein salient portions of the rollers protrude above the top conveying surface and below the bottom surface; and and a plurality of roller bearing surfaces supported in the conveyor beneath the bottom surface of the belt and arranged to underlie at least some of the rollers in rolling contact with the salient portions protruding below the bottom surface to rotate the rollers as the belt travels, thereby moving articles supported on the salient portions of the rollers protruding above the top conveying surface obliquely across the belt.

39. A conveyor as in claim 38 with at least one roller arranged to rotate about a roller rotation axis having an angle to the direction of belt travel different than the roller rotation axis of at least one other roller.

40. A conveyor as in claim 38 further comprising a plurality of roller bearing surfaces.

41. A conveyor as in claim 40 wherein the number of roller bearing surfaces is equal to the number of cylindrical rollers disposed in cavities aligned across a width of the conveyor belt.

42. A conveyor as in claim 38 wherein the roller bearing surfaces are powered to move into and out of contact with the rollers.

43. A conveyor as in claim 38 having roller axles extending through the rollers along axes of roller rotation and collinear holes in opposite walls of the cavities to support the ends of the roller axles.

44. A conveyor for moving conveyed articles across the conveying surface of a modular conveyor belt traveling in a direction of travel, comprising:

a modular conveyor belt supported in the conveyor and comprising a series of rows of belt modules and hinge pins hingedly interlinking consecutive belt rows end-to-end into a conveyor belt having a top conveying surface and an opposite bottom surface and forming a plurality of cavities opening across the width of the belt and onto the top conveying surface and the bottom surface;

the conveyor belt further including cylindrical rollers disposed in the cavities and arranged to rotate about axes oblique to the direction of belt travel, wherein salient portions of the rollers protrude above the top conveying surface and below the bottom surface; and a plurality of roller bearing surfaces equal in number to the number of rollers across the belt, the roller bearing surfaces supported in the conveyor beneath the bottom surface of the belt and arranged to underlie at least some of the rollers in rolling contact with the salient portions protruding below the bottom surface to rotate the rollers as the belt travels, thereby moving articles supported on the salient portions of the rollers protruding above the top conveying surface obliquely across the belt.

45. A conveyor as in claim 44 with at least one roller arranged to rotate about a roller rotation axis having an angle to the direction of belt travel different than the roller rotation axis of at least one other roller.

46. A conveyor as in claim 44 wherein the roller bearing surfaces are powered to move into and out of contact with the rollers.

* * * * *